US00RE44027E

(19) United States
(12) Reissued Patent
Kweon

(10) Patent Number: US RE44,027 E
(45) Date of Reissued Patent: *Feb. 19, 2013

(54) METHOD AND APPARATUS FOR PERMITTING A POTENTIAL VIEWER TO VIEW A DESIRED PROGRAM

(75) Inventor: Hyek Seong Kweon, Daegu (KR)

(73) Assignee: LG Electronics Inc., Seoul (KR)

( * ) Notice: This patent is subject to a terminal disclaimer.

(21) Appl. No.: 13/072,476

(22) Filed: Mar. 25, 2011

Related U.S. Patent Documents

Reissue of:
(64) Patent No.: 7,802,278
Issued: Sep. 21, 2010
Appl. No.: 10/412,343
Filed: Apr. 14, 2003

(30) Foreign Application Priority Data

Jul. 22, 2002 (KR) ..... 10-2002-0042860

(51) Int. Cl.
*H04N 7/16* (2006.01)
*G06F 17/30* (2006.01)
*G06F 17/00* (2006.01)
*G06F 7/04* (2006.01)
*G06F 15/16* (2006.01)

(52) U.S. Cl. ..... 725/30; 725/28; 725/29; 726/7; 726/28; 713/168

(58) Field of Classification Search ..... 725/28, 725/30
See application file for complete search history.

(56) References Cited

U.S. PATENT DOCUMENTS 5,331,353 A 7/1994 Levenson et al.
5,969,748 A 10/1999 Casement et al.
6,922,843 B1 7/2005 Herrington et al.
7,006,613 B2 2/2006 Novak et al.
7,124,426 B1 10/2006 Tsuria et al.
7,302,488 B2 11/2007 Mathew et al.
7,367,040 B2 4/2008 Yamauchi
7,464,392 B2 12/2008 Sie et al.
2002/0013941 A1* 1/2002 Ward et al. ..... 725/25
2002/0113941 A1 8/2002 Bees
2003/0014750 A1 1/2003 Kamen (Continued)

FOREIGN PATENT DOCUMENTS

CN 1172397 A 2/1998
CN 1276126 A 12/2000

(Continued)

*Primary Examiner* — Chris Parry
(74) *Attorney, Agent, or Firm* — Birch, Stewart, Kolasch & Birch, LLP

(57) ABSTRACT

A method and system prevents a potential viewer, such as a child, from viewing programming under certain conditions. For example, a programming receiver may be set up to prevent a child from viewing programming having a rating outside of an authorized rating limit, and/or from viewing programming during certain time periods, and/or from viewing any and all programming. When the child wishes to view a desired program, and the programming receiver determines that viewing is not permitted, the child is asked if they wish to seek permission from their parent or guardian to view the desired program. If so, an electronic request is made to a communication device, associated with the parent or guardian, such as a computer, personal digital assistant, cellular phone, or another television. The Request provides the parent with information regarding the desired program, and perhaps the identity of the requester. Hence, the parent can grant or deny permission to view the desired programming, from a remote location.

18 Claims, 6 Drawing Sheets

U.S. PATENT DOCUMENTS

| | | | |
|---|---|---|---|
| 2003/0030751 | A1 | 2/2003 | Lupulescu et al. |
| 2003/0103627 | A1 | 6/2003 | Nierzwick et al. |
| 2004/0163124 | A1 | 8/2004 | Basawapatna et al. |
| 2006/0031883 | A1 | 2/2006 | Ellis et al. |

FOREIGN PATENT DOCUMENTS

| | | | |
|---|---|---|---|
| CN | 1345160 | A | 4/2002 |
| CN | 1541479 | A | 10/2004 |
| EP | 0 742 669 | A1 | 11/1996 |
| EP | 0742669 | B1 | 10/1999 |
| WO | WO 00/04707 | A1 | 1/2000 |
| WO | WO 01/50741 | A1 | 7/2001 |
| WO | WO 02/01864 | A1 | 1/2002 |
| WO | WO 02/101524 | A2 | 12/2002 |

* cited by examiner

FIG. 3a

YOU ARE NOT PERMITTED TO WATCH
THE DESIRED PROGRAM.

DO YOU WANT TO REQUEST PERMISSION?
YES/NO

FIG. 3b

INPUT ID AND PASSWORD

· ID :
· PASSWORD :

FIG. 3c

YOU ARE NOT PERMITTED TO WATCH
THE DESIRED PROGRAM.

FIG. 4

REMOTE TV PERMISSION MAIL

AUDIENCE :01

CONTENTS OF PROGRAM

TITLE :SCENT OF A WOMAN
RATING :OVER 18
GENRE :DRAMA
COUNTRY :US
PRODUCTION DATE :1992
RUNNING TIME :137 MINUTES
DIRECTOR :MARTIN BREST
STARRING :AL PACINO / CHRIS O'DONNELL
FRANK SLADE(AL PACINO) IS A BLIND RETIRED ARMY OFFICER.
FRANK IS A CANTANKEROUS CYNICAL BULLY WHO COMPLETELY
SURPRISES CHARLIE WITH HIS PLANS FOR THEIR WEEKEND.

PERMISSION 0, NON-PERMISSION 1

METHOD AND APPARATUS FOR PERMITTING A POTENTIAL VIEWER TO VIEW A DESIRED PROGRAM

Matter enclosed in heavy brackets [ ] appears in the original patent but forms no part of this reissue specification; matter printed in italics indicates the additions made by reissue.

*This is a reissue of U.S. Pat. No. 7,802,278 B2 issued Sep. 21, 2010, which claims priority of Korean Patent Application No. 10-2002-0042860 filed Jul. 22, 2002. The entire contents of each of these applications are hereby incorporated by reference.*

*Notice: More than one reissue application has been filed for the reissue of U.S. Pat. No. 7,802,278 B2. The U.S. reissue applications are application Ser. No. 13/070,283 filed Mar. 23, 2011, and application Ser. No. 13/072,476 filed Mar. 25, 2011.*

BACKGROUND OF THE INVENTION

1. Field of the Invention

The present invention relates to a remote control method for permitting a potential viewer to view a desired broadcasting program, such as in connection with a digital television receiver. More particularly, the present invention provides a remote control method, which allows an authorized person to permit a potential viewer to view a desired program. The authorized person can provide permission to the potential viewer via an input on a cellular phone, personal digital assistant, laptop computer, desktop computer, or other communication device.

2. Description of the Related Art

Modern entertainment has progressed rapidly. Today, a large variety of programming is available by through-the-air broadcasting, cable systems, satellite systems and even programming over the Internet. Advances in encoding and compression methods, such as digital broadcasting, enable additional descriptive materials to accompany programming, such as a program's start and stop times, title, genre, actors/actresses, plot summary, and parental guidance rating.

Today, several television manufacturers and set-top receiver box manufacturers (e.g. satellite and cable) provide lockout options, which a parent can activate to prevent children from viewing adult related materials. When activated, a program, having a parental rating outside of a set limit or no rating, cannot be viewed. An adult can override the lock by entering a password into a control unit of the television or set-top box, most often using keystrokes on a remote control.

Often children desire to view, and have a legitimate reason to view, programs having a rating outside of the rating limit. For example, many educational programs are "not rated" and can trigger the lockout protection of the control unit. Further, a parent will often set the parental lock at "R" or "PG-13, " and still find some specific programs, having such a rating, suitable for their child. For example, an "R" rating may be due to violence portrayed in a true-story war movie. Despite the "R" rating, a parent may feel that the violence in the movie will not be harmful to their child. Under such circumstances, the parent may elect to input their password, override the control unit, and permit their child to view the movie.

The above-described system suffers drawbacks. Often a parent is not available to input a password to the control unit to allow a child to view a "suitable," but restricted program.

For example, the parent may be at work or traveling. A child could call and ask the parent for the password, but this would not be a suitable solution. The child might use the password to view other or additional programming besides the program described to, and authorized by, the parent. Further, the parent would later need to change the password after it is given to the child.

The above-described system also suffers another drawback. Children have a tendency to view too much programming and to view programming at inappropriate times, even if the programming has a rating within an authorized range. For example, some children have a television or Internet-linked computer in their bedroom, when the parents are away from home, working in another portion of the house or asleep, the children may be watching programming when they should be studying, doing chores, sleeping, etc. The system in accordance with the background art does not address this concern, in that it provides no limit on a child's viewing of programming within the restriction rating range.

Therefore, there is a need in the art for a remote control system, which permits a parent, not physically present with a child, to restrict a child's viewing of programs, which system yet enables the absent parent to permit the child to view a desired program, which is beneficial to the child, when the child requests permission.

SUMMARY OF THE INVENTION

It is an object of the present invention to address one or more of the drawback associated with the background art.

It is an object of the present invention to provide a method and apparatus for permitting a potential viewer to view a desired program, when viewing the desired program would be otherwise restricted.

These and other objects are achieved by a method and system which can prevent a potential viewer, such as a child, from viewing programming under certain conditions. For example, a programming receiver may be set up to prevent a child from viewing programming having a rating outside of an authorized rating limit, and/or from viewing programming during certain time periods, and/or from viewing any and all programming. When the child wishes to view a desired program, and the programming receiver determines that viewing is not permitted, the child is asked if they wish to seek permission from their parent or guardian to view the desired program. If so, an electronic request is made to a communication device, associated with the parent or guardian, such as a computer, personal digital assistant, cellular phone, or another television. The Request provides the parent with information regarding the desired program, and perhaps the identity of the requester. Hence, the parent can grant or deny permission to view the desired programming, from a remote location.

BRIEF DESCRIPTION OF THE DRAWINGS

The above objects, features and advantages of the present invention will become more apparent from the following detailed description when taken in conjunction with the accompanying drawings, in which:

FIGS. 3a to 3c show examples of messages displayed to a person desiring to watch a restricted program;

FIG. 4 shows an example of a message displayed on a communication device of an authorized person who can grant permission to the person desiring to view a program;

DETAILED DESCRIPTION OF THE PREFERRED EMBODIMENT

Figure 1:
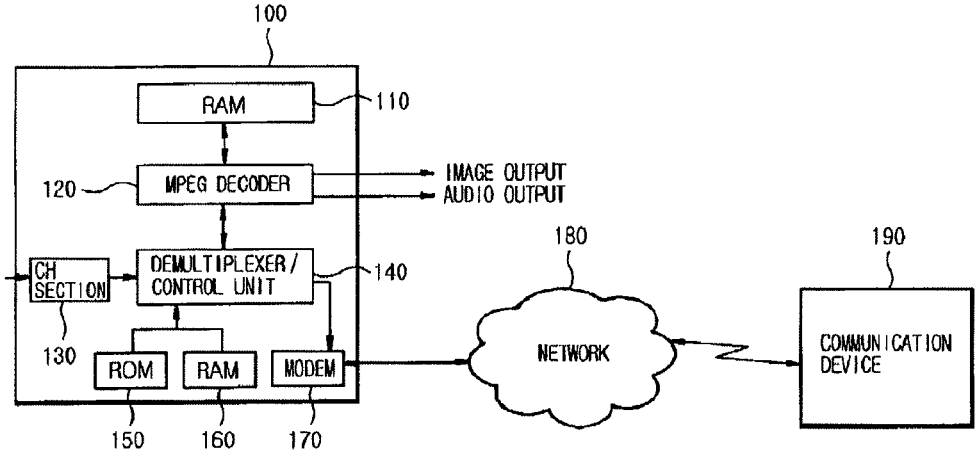
FIG. 1 is a schematic block diagram illustrating a system using a remote control method for permitting a viewer to view a desired program, in accordance with an embodiment of the present invention.

A preferred embodiment of the present invention will now be described with reference to the accompanying drawings. In the following description, same drawing reference numerals are used for the same elements even in different drawings.

FIG. 1 is a schematic block diagram illustrating a system using a remote control method for permitting a person to request permission to view a desired program, in accordance with an embodiment of the present invention. The desired program could be a movie, documentary, or any other type of program broadcast over a satellite system, a cable system, an over-the-air broadcast, an Internet broadcast, or any other form of broadcasting a program.

Referring to FIG. 1, in one embodiment, the system includes a programming receiver 100 (e.g. an integrated digital TV receiver, a set-top receiver box) having a modem 170. A communication device 190 is provided at a location remote from the programming receiver 100. An authorized person (e.g. a parent, grandparent, guardian, etc.) operates the communication device 190.

A connection is established between the communication device 190 and the receiver 100. The connection can be wired or wireless. For example, if the communication device is provided within a single family home, the connection could be a 2.4 Ghz wireless connection, a coaxial cable connection, a phone line connection, etc.

If the communication device 190 is located at a greater distance from the receiver 100, the connection may be again be wireless or wired. For example, if the communication device 190 is a desktop or laptop computer at a parent's place of work, a cellular phone, or a personal digital assistant (PDA), the connection could be established over a network 180, such as a wireless cellular network, a public switched telephone network, or the Internet.

Still referring to FIG. 1, the programming receiver 100 may additionally include a CH section 130 (for selecting a desired program to view), an MPEG decoder 120, a demultiplexer/control unit 140, a ROM 150, and RAMs 160 and 110. The demultiplexer/control unit 140 may be advantageously formed as a microprocessor.

In digital broadcasting, a plurality of element streams are multiplexed and transmitted through a plurality of transmission media and networks. The plurality of element streams compose one service, the plurality of services compose one transport stream, and the transport stream is transmitted to a respective digital television receiver through the plurality of networks. The digital television receiver in a particular house can search and receive a desired program of a viewer from among the transmitted streams.

Special, supplemental information is often transmitted to the digital television receiver in addition to the aforementioned streams. The supplemental information gives program guidance information on programs available for viewing, e.g. a rating of the program, a duration of the program, a start time of the program, a title of the program, and a summary description of the program. European DVB standards and American ATSC standards exist for the program guidance information.

The European DVB standards include a plurality of service information tables. Among the service information tables, an event information table provides information on each broadcasting program called events. The event information table includes information such as titles, start times and broadcasting periods of each broadcasting program. The digital television receiver outputs the transmitted information on the screen in an electronic program guide form.

The aforementioned service information tables also include various detailed information by using descriptor fields. Among the descriptor fields, a parental rating descriptor (X, R, PG-13, PG, G, N/R, etc.) can used to set up a parental lock, at the discretion of the parents or guardians. The age limits are dependent upon the contents of the broadcasting programs and the broadcasting countries. Accordingly, the parental rating descriptor displays country ID codes and age limits. The parental rating descriptor is included in the event information table and transmitted to each programming receiver 100.

Most digital television receivers allow a parent or guardian to set up a viewing restriction of a receiver using menu screens. The receiver analyzes the parental rating from the event information table for the transmitted broadcasting program. When the rating from the parental rating is lower than the predetermined viewing restriction rating, the receiver displays the broadcasting program on the screen. However, when the rating, extracted from the supplemental information, is higher than the predetermined viewing restriction rating, the receiver displays a message notifying the potential viewer that they are not permitted to view the broadcasting program. The receiver will not permit the program to be displayed on the screen, unless a parent or guardian inputs a password and overrides the protection system.

In the conventional programming control method, when the parent or guardian has at least two children, it is difficult to set the viewing restriction rating, since one child may be old/mature enough to watch programming not suitable for the other child. Therefore, when the parents go out, they cannot permit their children to view a program over the predetermined viewing restriction grade of the youngest child. To address this, the present invention provides a remote control method for permitting a potential viewer to view a program over the predetermined viewing restriction grade, previously stored the programming receiver 100.

Figure 2:
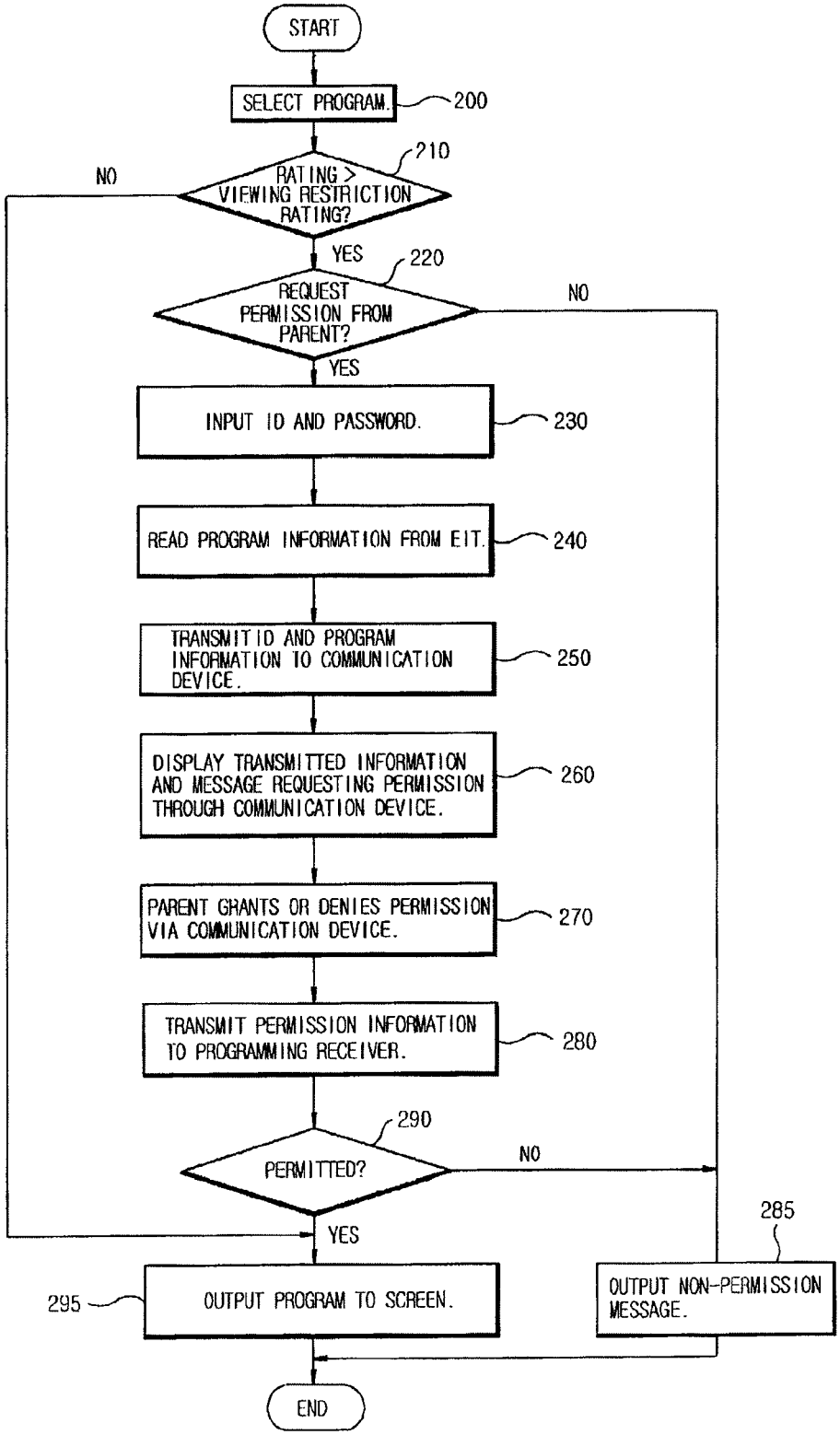
FIG. 2 is a flowchart illustrating steps of the remote control method for permitting the viewer to view a desired program, in accordance with an embodiment of the present invention.

FIG. 2 is a flowchart showing sequential steps of the remote control method for permitting a potential viewer to view a desired program, in accordance with an embodiment of the present invention. In step 200, the potential viewer selects a desired program. A rating of the selected program is extracted from the parental rating descriptor field of the event information table, and in step 210, the rating of the selected program is compared with a viewing rating restriction, preset by the parent or guardian, which is stored in the ROM 150 of the programming receiver 100.

If the rating of the selected program is lower than the predetermined viewing restriction rating in step 210, the process proceeds to step 295. In step 295, the programming receiver 100 outputs the selected program to the screen (of the TV or computer, as the case may be), so that the a viewer can view it.

If the rating of the selected program is higher than the predetermined viewing restriction rating in step 210, the process proceeds to step 220. In step 220, the programming receiver 100 displays a message (e.g. via the screen of the TV or computer monitor) asking the potential viewer to request permission from the parent or guardian to view the desired program. An example of such as a prompt is illustrated in FIG. 3a.

If the potential viewer answers "no," the method proceeds to step 285. In step 285, the programming receiver 00 may display a message notifying the potential viewer that the request has not been made and that the program is not viewable due to its restriction rating. An example of such a display screen is illustrated in FIG. 3c. After step 285, the process ends. For example, the potential viewer is returned to a selection menu or program guide display.

If the potential viewer answers "yes," in step 220, the method proceeds to step 230. In step 230, the programming receiver 100 allows the potential viewer to input his/her ID as identification information and a password. It should be appreciated that in households with multiple children, each child could have a unique ID and password, such that each child could have a unique ratings limit for viewing programming.

Next, in step 240, the programming receiver 100 reads the program information, relating to the desired program, from the event information table. In step 250, the program information corresponding to the desired program, along with the potential viewer's ID and password are transmitted to the communication device 190 of the parent or guardian, such as by employing the modem 170.

It should be appreciated that the ID and password of the potential viewer could be verified either in the programming receiver 100 or the communication device 190. In one embodiment, the verification takes place in the programming receiver 100, and the potential viewer is notified via the screen if the input password does not match the input ID. Under such a circumstance, a permission request is not sent to the communication device, but rather the potential viewer is prompted to input their ID and password again.

It would also be possible to verify the ID and password at the communication device 190. Under this circumstance, it is possible for the parent or guardian to see if a child is attempting to "break into" the system and view a restricted program by submitting multiple, "possible" passwords for an older sibling's ID.

In step 260, the program information and ID are displayed on the communication device 190. It is envisioned that the communication device 190 could be a cellular telephone, a computer (either a portable or desktop at home or work), a personal digital assistant, or even another television (such as a television located in the parent's bedroom). When another television, within the same home as the child, is employed as the communication device 190, it is advantageous that the network 180, established between the communication device 190 and the programming receiver 100, is a local area network, such as a wireless 2.4 Ghz network, or a wired network (employing coaxial cable, phone lines, fiber optic lines, etc). When the communication device 190 is connected to the programming receiver 100 via the Internet, it is advantageous to send communications between the two as emails.

FIG. 4 illustrates one embodiment of the display on the communication device 190. In FIG. 4, the potential viewer's ID is displayed in the "audience" field as "01." The parent would know that "01" stands for a particular one of their children, e.g. the oldest child. Of course, the actual name of the child could be displayed, instead of"01."

As seen in FIG. 4, the program information includes such data as the title of the program, rating of the program, genre, country of origin, production date, running time, director, actor/actresses, and a summary of the program's content. The screen also provides an option to grant or deny permission for viewing of the desired program. It is in accordance with the present invention that the communication device 190 would prompt the parent or guardian to input an authorized person's user ID and password, to make certain that it is indeed a parent or guardian (not a mischievous child) that is granting permission to view the desired program.

In step 270, the parent or guardian selects either to grant or to deny viewing permission. In step 280, the communication device 190 transmits the answer inputted by the parent or guardian to the programming receiver 100 via the network 180.

In step 290, the programming receiver 100, which receives the answer from the communication device 190 of the parent or guardian, analyzes the answer to determine whether or not viewing of the desired program is permitted. If viewing of the desired program is not permitted, the method proceeds to step 285, and the screen of the potential viewer displays a message, e.g. FIG. 3c.

If viewing is permitted, the method proceeds to step 295. In step 295, the programming receiver 100 outputs the desired program, such as by using the MPEG decoder 120.

Figure 5:
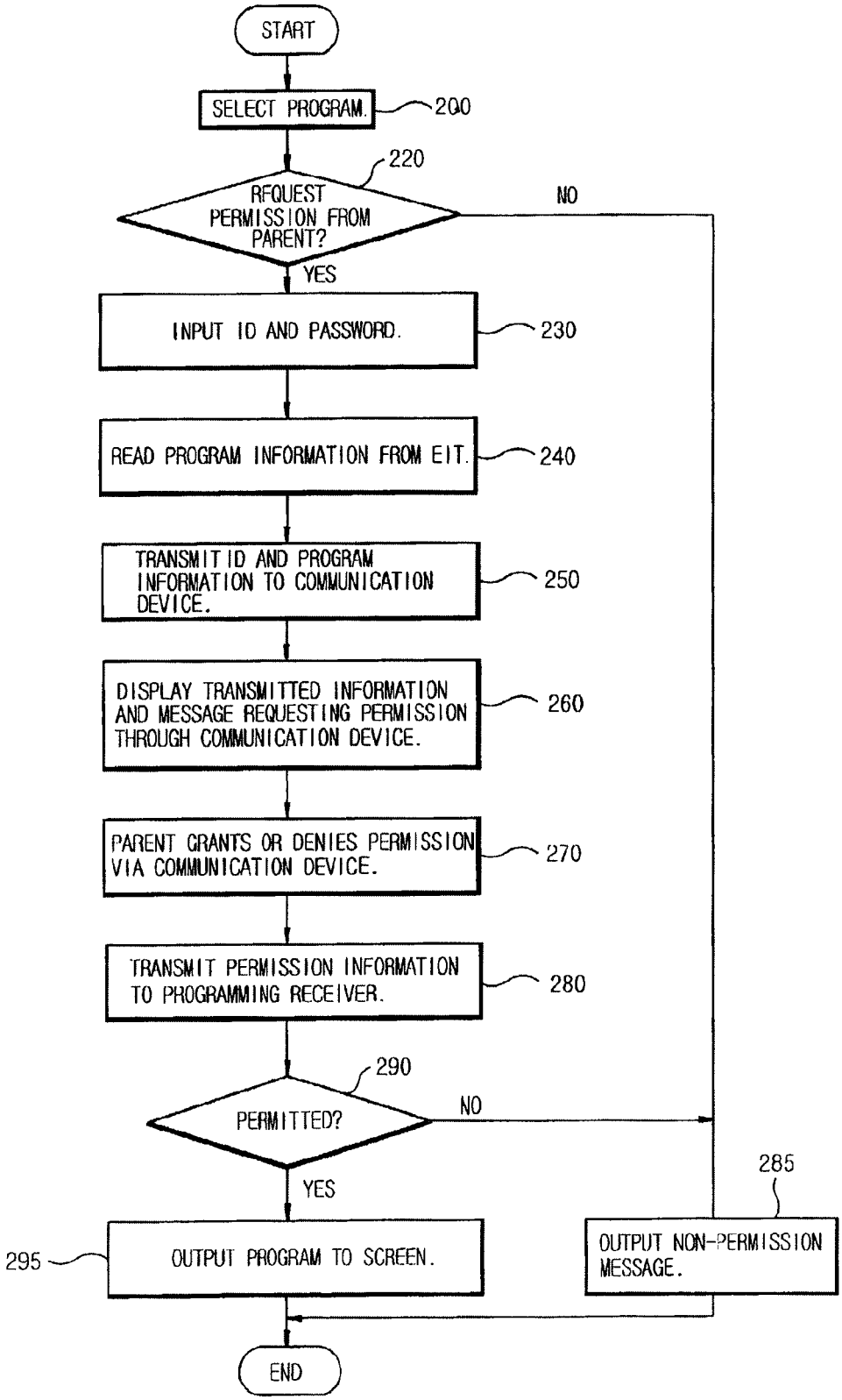
FIG. 5 is a flowchart illustrating steps of the remote control method for permitting the viewer to view a desired program, in accordance with a first alternative embodiment of the present invention.

FIG. 5 illustrates a first alternative method of operation for the present invention. The method of FIG. 5 is analogous to the method of FIG. 2, except that the method step 210 has been removed. In the method of FIG. 5, the child must request permission for each program to be viewed, regardless of its rating. In other words, the method of FIG. 5 is beneficial to parents concerned that their children watch too much programming while the parents are absent.

In FIG. 5, a child desiring to watch a program would activate the programming receiver 100 (e.g. cable set-top box, satellite set-top box, etc.) to start the method. In step 200, the display (e.g. television screen, computer monitor, etc.) would display a program guide, and the child would select a desired program to view. Next, the method would proceed directly to step 220.

In step 220, the potential viewer would be asked if they wish to request permission to view the desired program. The remainder of the method follows the description, as set forth in combination with FIG. 2, above.

Figure 6:
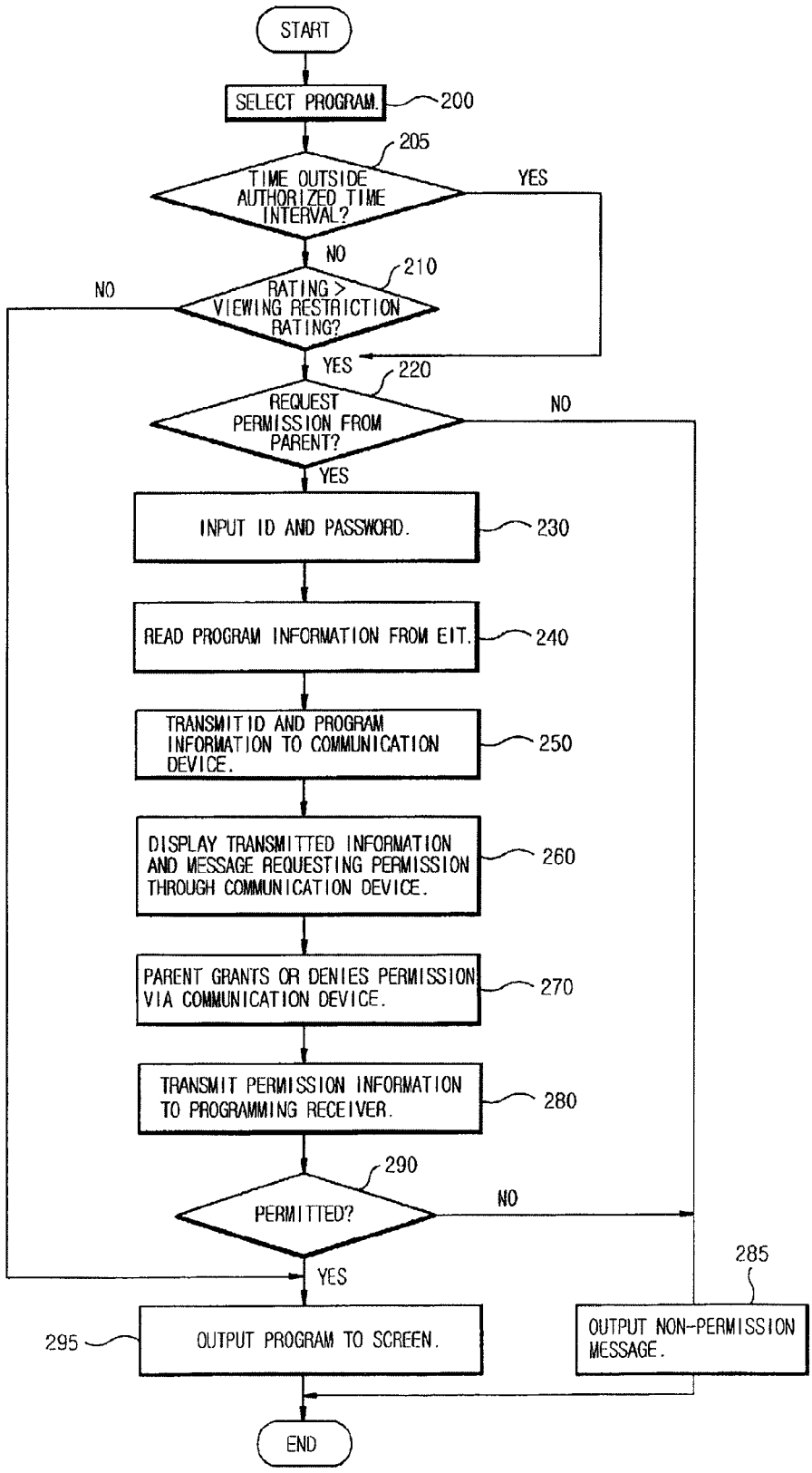
FIG. 6 is a flowchart illustrating steps of the remote control method for permitting the viewer to view a desired program, in accordance with a second alternative embodiment of the present invention.

FIG. 6 illustrates a second alternative method of operation for the present invention. The method of FIG. 6 is analogous to the method of FIG. 2, except that the method step 205 has been added prior to the method step 210. In the method of FIG. 6, the child must request permission for each program to be viewed, regardless of its rating, when the current time is outside of a permitting viewing time. In other words, the method of FIG. 6 is beneficial to parents concerned that their children watch programming at inappropriate times (e.g. during study times or sleeping times) while the parents are absent.

In FIG. 6, a child desiring to watch a program would activate the programming receiver 100 (e.g. cable set-top box, satellite set-top box, etc.) to start the method. In step 200, the display (e.g. television screen, computer monitor, etc.) would display a program guide, and the child would select a desired program to view. Next, the method would proceed to step 205.

In step 205, the current time is compared to a preset authorized range of viewing times. If the current time is outside the authorized range of viewing times, the method skips step 210 and proceeds directly to step 220. If the current time is within the authorized range of viewing times, the method proceeds to the step 210, where a rating of the desired program is compared to the authorized rating range.

By the method of FIG. 6, it is possible to prevent a child from viewing a program when the current time is outside of a preset time interval. Of course, the comparison in method step 205 could be modified in several ways. For example, instead of comparing the present time to the authorized range of viewing times, the method could compare the start and stop times of the programming to the authorized range of viewing times. In this manner, the child must request permission to view a program, which ends after the expiration of their authorized viewing time range.

Further, the current time could be used as interrupt signal to the control unit 140. Under this control method, the current time is read by the control unit 140 at set intervals, e.g. once each minute. When the current time falls outside of the authorized viewing time range, the programming receiver 100 causes the display of FIG. 3a to appear on the screen.

By this arrangement, the child is allowed to view a desired program, having an acceptable rating, up until a certain time interval before expiry of their authorized viewing time range expires (e.g. 15 minutes). After that, the child must decide whether to request permission to continue viewing the program or to not request permission (step 220). The screen of FIG. 3a, could be a translucent overlay screen which permits the child to continue watching the programming while the permission request is displayed on the screen.

The fifteen minute interval allows time for the permission request to be processed (steps 240, 250), and to wait for the permission information from the communication device 190 (steps 260, 270, 280). If the child does not request permission to continue viewing the program, or if the parent fails to grant permission to continue viewing of the program, the programming receiver 100, stops outputting the desired program at expiry of the authorized viewing time range, and a screen, such as FIG. 3c, is displayed to the potential viewer.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

[1. A control method for permitting a viewer to view a specific program, the method comprising:

receiving at a program viewing controller at least one transport stream from a broadcast service, the program viewing controller being configured to selectively decode and output programs of the at least one transport stream according to a broadcast time set by the broadcast service, the received at least one transport stream including information indicative of the specific program;

selecting the specific program via the program viewing controller;

inputting, to the program viewing controller, a viewer ID and viewer password associated with a person selecting the specific program, the inputted ID and viewer password indicating to an authorized person a potential viewer of the selected program;

transmitting, according to said selecting, the inputted viewer ID and viewer password and the information indicative of the specific program from the program viewing controller to a communication device of the authorized person, and using the transmitted information to request via the communication device permission for the viewer to view the specific program of said selecting;

receiving at the program viewing controller information from the communication device in response to said transmitting, the received information indicating whether to permit viewing of the specific program; and determining, based upon the received information, whether to decode and output the specific program at the broadcast time.]

[2. The method according to claim 1, wherein, if the viewer ID and the viewer password meet predetermined criteria, said transmitting includes transmitting at least the viewer ID from the program viewing controller to the communication device of the authorized person.]

[3. The method according to claim 1, wherein said transmitting of the inputted viewer ID and the inputted viewer password from the program viewing controller to the communication device of the authorized person occurs for each instance of said inputting.]

[4. The method according to claim 3, further comprising:

verifying the viewer ID and the viewer password at the communication device after said transmitting the viewer ID and the viewer password.]

[5. The method according to claim 1, wherein the information indicative of the specific program includes at least one of a rating of the specific program, a duration of the specific program, a start time of the specific program, a title of the specific program, and a summary description of the specific program.]

[6. The method according to claim 1, further comprising:

inputting to the communication device one of an authorization and denial to view the specific program based on the information indicative of the specific program; and transmitting the one of the authorization and denial to the program viewing controller as the information indicating whether to permit viewing of the specific program.]

[7. The method according to claim 6, further comprising:

inputting an authorized ID and an authorized password to the communication device, to verify the authorized person prior to said transmitting the one of the authorization and denial.]

[8. The method according to claim 6, further comprising:

displaying at least the viewer ID via the communication device prior to inputting the one of the authorization and denial.]

[9. The method according to claim 8, further comprising:

verifying the viewer ID and the viewer password at the program viewing controller before said transmitting a viewer ID and a viewer password.]

[10. The method according to claim 6, wherein said inputting one of an authorization and denial is performed by a personal communication device including one of a cellular phone, a personal digital assistant, a laptop computer, and a desktop computer.]

[11. The method according to claim 1, wherein the communication device is not a part of the broadcast service, is provided separately from the broadcast service, and is connected to the program viewing controller separately from the broadcast service.]

[12. The method according to claim 1, further comprising:

comparing a restriction rating of the specific program with an authorized rating range, to determine whether the restriction rating of the specific program is outside the authorized rating range, wherein said transmitting is conditionally performed according to said comparing.]

[13. The method according to claim 1, further comprising:

comparing the broadcast time of the specific program with an authorized viewing time range, to determine whether the broadcast time of the specific program is outside the authorized viewing time range, wherein said transmitting is conditionally performed according to said comparing.]

[14. The method according to claim 1, wherein, in response to each instance of said selecting, the program viewing controller uploads to a network the inputted viewer ID and viewer password and the information indicative of the specific program, the network transmitting the uploaded viewer ID and viewer password and the information indicative of the specific program directly to the communication device of the authorized person.]

[15. The method according to claim 1, wherein said transmitting and said receiving enable the determination of whether to decode and output the specific program to be performed in advance of the broadcast time of the selected specific program and to be performed without interruption of a current broadcast.]

[16. A program viewing controller, comprising:

a program receiver configured to receive at least one transport stream from a broadcast service and to selectively decode and output programs of the at least one transport stream according to a broadcast time set by the broadcast service, the received at least one transport stream including information indicative of a specific program;

a selector configured to select the specific program from the programs;

means for inputting a viewer ID and viewer password associated with a person selecting the specific program, the inputted ID and viewer password indicating to an authorized person a potential viewer of the selected program;

a request transmitter configured to transmit, according to the selecting of said selector, the inputted viewer ID and viewer password and the information indicative of the specific program to a communication device of the authorized person, the transmitted information being used to request via said communication device permission for a viewer to view the specific program of the selecting of said selector;

an answer receiver configured to receive answer information from the communication device in response to the transmission from said request transmitter; and a control unit configured to determine, based upon said answer information, whether to decode and output the specific program at the broadcast time.]

[17. The program viewing controller according to claim 16, wherein the communication device is not a part of the broadcast service, is provided separately from the broadcast service, and is connected to said program viewing controller separately from the broadcast service.]

[18. A system, comprising:

a program viewing controller; and a communication device of an authorized person, wherein said program viewing controller includes:

a program receiver configured to receive at least one transport stream from a broadcast service and to selectively decode and output programs of the at least one transport stream according to a broadcast time set by the broadcast service, the received at least one transport stream including information indicative of a specific program;

a selector configured to select the specific program from the programs;

means for inputting a viewer ID and viewer password associated with a person selecting the specific program, the inputted ID and viewer password indicating to the authorized person a potential viewer of the selected program;

a request transmitter configured to transmit, according to the selecting of said selector, the inputted viewer ID and viewer password and the information indicative of the specific program to said communication device, the transmitted information being used to request via said communication device permission for a viewer to view the specific program of the selecting of said selector;

an answer receiver configured to receive answer information from said communication device in response to the transmission from said request transmitter; and a control unit configured to determine, based upon the answer information, whether to decode and output the specific program at the broadcast time, and wherein said communication device includes:

a request receiver configured to receive the request information; and an answer transmitter configured to transmit the answer information to said program viewing controller.]

[19. The system according to claim 18, wherein the communication device is not a part of the broadcast service, is provided separately from the broadcast service, and is connected to said program viewing controller separately from the broadcast service.]

*20. A method for transmitting information of a specific program in a digital receiver, the method comprising:*

*receiving at least one transport stream from a broadcast service,*

*decoding by a decoder the received at least one transport stream from the broadcast service;*

*extracting information of the specific program from the received at least one transport stream, wherein the information of the specific program includes a summary of the specific program;*

*selecting the specific program;*

*establishing a communication to a communication device of a receiving entity;*

*transmitting, according to said selecting, an ID of a sending entity and the information of the specific program including the summary of the specific program to the communication device of an authorized person if the specific program's viewer is logged in, wherein the ID of the sending entity corresponds to the viewer's ID information and password; and*

*receiving from the communication device of the receiving entity an answer in response to said transmitting.*

*21. The method according to claim 20, wherein the answer is one of a grant and a denial.*

*22. The method according to claim 20, wherein the sending entity is a viewer.*

*23. The method according to claim 20, wherein the receiving entity is an authorized person.*

*24. The method according to claim 20, wherein the receiving entity is a pre-designated entity.*

*25. The method according to claim 20, wherein the broadcast service is one of an internet broadcast, an over-the-air broadcast, a cable broadcast and a satellite broadcast.*

*26. The method according to claim 20, wherein the established communication is one of wired and wireless.*

*27. The method according to claim 20, wherein the communication device is provided within a dwelling.*

*28. The method according to claim 20, wherein the communication device is one of a computer, a cellular phone, and personal digital assistant (PDA).*

*29. A program viewing controller, comprising:*

*a program receiver configured to receive at least one transport stream from a broadcast service;*

*a decoder configured to decode the received at least one transport stream from the broadcast service;*

*a control unit configured to control extracting of information of the specific program from the received at least one transport stream, wherein the information of the specific program includes a summary of the specific program;*

*a selector configured to select the specific program;*

*a request transmitter configured to establish a communication to a communication device of a receiving entity, and to transmit, according to said selection, an ID of a sending entity and the information of the specific program including the summary of the specific program to the communication device of an authorized person if the specific program's viewer is logged in, wherein the ID of the sending entity corresponds to the viewer's ID information and password; and*

*an answer receiver configured to receive from the communication device an answer in response to said transmitting.*

*30. The program viewing controller according to claim 29, wherein the answer is one of a grant and a denial.*

*31. The program viewing controller according to claim 29, wherein the sending entity is a viewer.*

*32. The program viewing controller according to claim 29, wherein the receiving entity is an authorized person.*

*33. The program viewing controller according to claim 29, wherein the receiving entity is a pre-designated entity.*

*34. The program viewing controller according to claim 29, wherein the broadcast service is one of an internet broadcast, an over-the-air broadcast, a cable broadcast and a satellite broadcast.*

*35. The program viewing controller according to claim 29, wherein the established communication is one of wired and wireless.*

*36. The program viewing controller according to claim 29, wherein the communication device is provided within a dwelling.*

*37. The program viewing controller according to claim 29, wherein the communication device is one of a computer, a cellular phone, and personal digital assistant (PDA).*

* * * * *